UNITED STATES PATENT OFFICE.

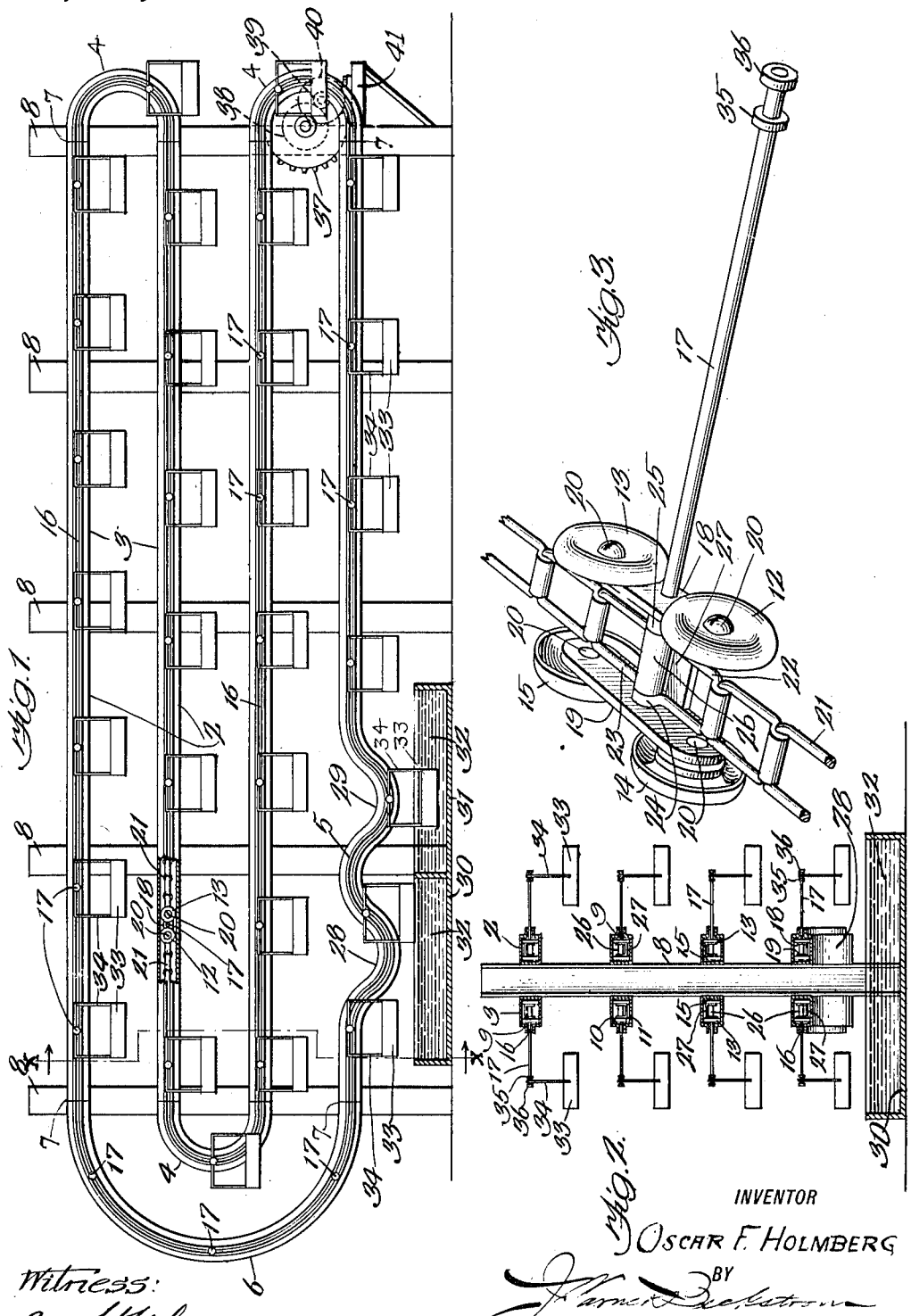

OSCAR F. HOLMBERG, OF CHICAGO, ILLINOIS, ASSIGNOR OF ONE-HALF TO CHARLES TRABING, OF CHICAGO, ILLINOIS.

MACHINERY FOR TREATING EGGS.

1,270,755.   Specification of Letters Patent.   Patented June 25, 1918.

Application filed March 23, 1917. Serial No. 156,862.

*To all whom it may concern:*

Be it known that I, OSCAR F. HOLMBERG, generally known as FRED HOLMBERG, a citizen of the United States, residing at Chicago, in the county of Cook and State of Illinois, have invented certain new and useful Improvements in Machinery for Treating Eggs, of which the following is a specification.

My invention relates to mechanism for sterilizing or treating eggs to increase their keeping qualities, and has particular reference to a continuously operative conveyer and dipping and drying device for carrying receptacles containing eggs through the process and returning them to the starting point. The objects of the invention are to provide a mechanism of this type that shall involve a minimum of complicated parts; that shall be easy to erect; that shall occupy a small amount of space, considering its capacity; that shall be conveniently operable and with the aid of which one or two operators may be enabled to treat a large quantity of eggs within a short period of time.

With the above named objects in view the present invention consists in the novel construction, combination and arrangement of parts, all as hereinafter described in detail, illustrated in the accompanying drawing and more particularly pointed out in the appended claims.

In the drawing—

Figure 1 is a side elevation, partly broken away, and partly in section, of a mechanism embodying my invention.

Fig. 2 is an end view of same in section taken substantially on the line X—X of Fig. 1.

Fig. 3 is a perspective view of one of the four-wheels trucks.

In the several views 2 represents an endless conveyer track made of straight channel iron sections 3 and curved sections 4, 5 and 6 joined end to end as at 7, 7 and fastened in any suitable manner to opposite sides of I-beam posts 8, 8 which provides an endless track on each side of said posts. The openings into the channel irons are contracted by right angle bends 9, as shown in Fig. 2, which provides inner ledges or walls 10 and 11 that serve as side rails or stops for outer wheels 12 and 13 of four-wheel trucks having inner wheels 14 and 15. The contracted track opening 16 is of sufficient width to receive therein rods or arms 17 that are secured to side pieces 18 and 19 which form the bodies of the trucks and to which the wheels are journaled by means of screws 20 which have threaded engagement with said side pieces.

The trucks are connected and spaced apart by a sprocket chain 21 which at suitable intervals have adjacent pairs of links 22 and 23, provided, respectively, with a pair of loops 24 and 25 on one link and a knuckle 26 on the other link, which are pivoted to each rod 17 as clearly shown in Fig. 3. The side pieces 18 and 19 are struck out of a single piece of metal including a connective portion 27 between the lower edges of said side pieces, the body of the truck thereby having substantially the configuration of a letter H with the parallel sides 18 and 19 bent at right angles to the connective portion 27. In the lowest run of the track are curved portions or dips 28 and 29, underneath which are placed tanks or troughs 30 and 31 containing a suitable sterilizing, or pore-sealing liquid 32 into which eggs in baskets or containers 33 carried on the rods 17, are dipped. Each of these baskets is provided with a suitable bail or handle of wire 34 that is loosely mounted between collars 35 and 36 that are shrunk, or otherwise secured, to the outer or free ends of the rods 17. The sprocket chain is drawn through the channel iron track 2 by means of a sprocket wheel 37 placed in one of the return bends at the far end of the conveyer, as shown, and driven by any suitable source of power, as by a gear wheel 38 on the sprocket wheel that is, in turn driven by a pinion 39, meshing with a gear wheel 40 on a motor or driving shaft, for which a support or shelf 41 may be provided on the track.

In operation the operator or operators is or are placed at the left hand end of the track the topmost and lowermost runs of which are connected by the large curved portion 6 where the egg receptacles 33 are hung on the moving rods 17 and removed from same after their return via the uppermost run. The track is extended into a plurality of runs to give the dipped eggs sufficient time to become drained or dried and adapted to be returned to the egg cases. By providing the two tracks and arranging them closely together on opposite sides of the posts 8 a great saving of space is effected and the operator mounting and removing the baskets may serve both chains of carriers at the same time and hang and remove two containers 33 at the same time by using both hands.

Having thus described my invention, I claim as new and desire to secure by Letters Patent—

1. An endless track consisting of channel irons with their two parallel sides arranged in a horizontal position, vertical ledges extending from said sides and providing openings therebetween, trucks arranged to travel within said channel irons, rods extending from said trucks through said openings, a chain and the like connecting said trucks, and means for imparting movement to said trucks along said track.

2. In combination, an endless track consisting of parallel runs of four-sided channels with a slotted opening in one side connected by curved track portions, a series of trucks mounted within said channels, said trucks being confined to move within and along said channels, arms extending horizontally from said trucks through the slot opening, a dipping tank, a depressed portion in the track above said tank, and egg containers removably mounted on said arms.

3. In combination, I-beam posts, four-sided channels secured to opposite sides of said posts, said channels being slotted through their outer vertical sides and arranged to form a pair of endless tracks, trucks mounted within said channels to move along same, connections between said trucks, means for moving said trucks and connections as an endless chain, means for supporting egg receptacles on said trucks, and means for dipping the latter.

In testimony whereof I have hereunto signed my name.

OSCAR F. HOLMBERG.